L

(12) United States Patent
Bertucelli

(10) Patent No.: US 11,225,304 B2
(45) Date of Patent: Jan. 18, 2022

(54) INSULATION BOXES

(71) Applicant: Dow Global Technologies LLC, Midland, MI (US)

(72) Inventor: Luigi Bertucelli, Reggio Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/763,050

(22) PCT Filed: Nov. 5, 2018

(86) PCT No.: PCT/US2018/059200
§ 371 (c)(1),
(2) Date: May 11, 2020

(87) PCT Pub. No.: WO2019/108344
PCT Pub. Date: Jun. 6, 2019

(65) Prior Publication Data
US 2020/0346720 A1    Nov. 5, 2020

(30) Foreign Application Priority Data

Nov. 28, 2017  (IT) .......................... 102017000136505

(51) Int. Cl.
*B63B 25/16* (2006.01)
*F17C 3/02* (2006.01)

(52) U.S. Cl.
CPC .............. *B63B 25/16* (2013.01); *F17C 3/027* (2013.01); *F17C 2203/035* (2013.01); *F17C 2203/0333* (2013.01); *F17C 2203/0358* (2013.01); *F17C 2221/033* (2013.01); *F17C 2270/0105* (2013.01)

(58) Field of Classification Search
CPC ........... B63B 25/00; B63B 25/16; B32B 5/00; B32B 5/02; B32B 5/12; B32B 5/18; B32B 5/20; B32B 5/22; B32B 5/28; F17C 3/02; F17C 3/027; F17C 2203/0333; F17C 2203/035; F17C 2203/0358; F17C 2221/033

USPC ....................................................... 114/74 A
See application file for complete search history.

(56) References Cited

U.S. PATENT DOCUMENTS

| 7,597,212 | B2 | 10/2009 | Yang et al. | |
| 8,617,699 | B2 | 12/2013 | Paradis et al. | |
| 10,513,316 | B2 * | 12/2019 | Park | B63B 25/16 |
| 10,578,248 | B2 * | 3/2020 | Delanoe | B63B 25/08 |
| 2017/0022704 | A1 | 1/2017 | Bertucelli et al. | |

FOREIGN PATENT DOCUMENTS

| AU | 2012291901 B2 | 10/2015 |
| EP | 2777926 A1 | 9/2014 |
| FR | 2987424 A1 | 8/2013 |
| FR | 3007498 A1 | 12/2014 |
| WO | 2013053566 A1 | 4/2013 |
| WO | 2013098859 A1 | 7/2013 |
| WO | 2014/158512 A1 | 10/2014 |
| WO | 2015/161024 A1 | 10/2015 |

OTHER PUBLICATIONS

PCT/US2018/059200, International Search Report and Written Opinion dated Feb. 15, 2019.
PCT/US2018/059200, International Preliminary Report on Patentability dated Jun. 2, 2020.

* cited by examiner

*Primary Examiner* — Lars A Olson

(57) ABSTRACT

An insulation box of an insulating barrier in a liquefied gas carrier includes a box structure that includes a bottom panel, a top panel, external pillars, and optionally at least one internal partition that define at least one void. The at least one void includes at least one multilayer insulation board. Each of the at least one multilayer insulation board includes at least one facer layer, at least one first polyurethane layer having a first density from 100 kg/m$^3$ to 2000 kg/m$^3$ according to ASTM D 1622, and at least one second polyurethane layer having a second density of less than 100 kg/m$^3$ according to ASTM D 1622.

9 Claims, No Drawings

INSULATION BOXES

FIELD

Embodiments relate to insulation boxes that include multilayer insulation boards, use of multilayer insulation boards in insulation boxes for a liquefied gas carrier, methods of manufacturing multilayer insulation boards, methods of manufacturing insulation boxes with multilayer insulation boards, and methods of making a liquefied gas carrier that includes insulation boxes with multilayer insulation boards.

INTRODUCTION

Certain gases may be liquefied for storage and/or transport in a liquefied gas carrier. An example of such is liquefied natural gas (LNG), which is a natural gas that has been converted to liquid form for ease of storage and/or transport. For example, the LNG may be condensed into a liquid at close to atmospheric pressure by cooling to temperatures around less than −150° C. The LNG may achieve a higher reduction of volume as compared to compressed natural gas, so as to be potentially be more cost efficient for storage and transport. However, LNG can be hazardous, such as having significantly increased potential for flammability after vaporization in a gaseous state. Accordingly, specialized carriers may be used in the storage and/or transport of LNG.

The specialized LNG carriers may include integral tanks, e.g., that form a primary structural part of a ship, and/or independent tanks, e.g., that do not form an integral part of the hull structure of a ship. Referring to U.S. Pat. No. 7,597,212, a storage tank may include a tank material and an insulating material. Exemplary insulating materials are described as either (i) a reinforced polyurethane foam having a thickness of 250 mm, or (ii) a plywood box with perlite glass therewithin having a thickness of 530 mm.

Also, European Patent Application No. EP 2739895 A1 (and corresponding Chinese Patent No. CN103748401B) discloses, with reference to France Application No. FR-A-2867831, that an LNG insulation tank arranging the hull of a ship may include a primary insulating barrier and a secondary insulating barrier that are constituted in a modular fashion using parallelepipedic bodies in juxtaposed timber to form boxes. Referring to Chinese Patent No. CN103748401B, a box 11 is disclosed as including a cover panel 18 (not shown—e.g., plywood 9 mm), a bottom panel 17 (e.g., plated 9 mm), external veils 16 (e.g., plated-cons), internal partitions 15 (e.g., plywood), and fixed battans 9 (at each corner). The boxes 11 are filled with a heat-insulating lining expanded perlite or aerogels materials.

European Patent Application No. EP 2739895 A1 further discloses, with reference to France Application No. FR-A-2798902, that an LNG tank arranged in the hull of a vessel may include a primary insulating barrier and a secondary insulating barrier, of which each are constituted of a single layer-filled boxes of low density foam of order of 33-40 kg/m³ glued to plywood spacers. It is disclosed in Chinese Patent No. CN103748401B, with reference to drawings, that a modified arrangement includes at least one sealing barrier and at least one insulating barrier disposed between the sealing barrier and a supporting structure. With respect to the insulating barrier, it is disclosed that a primary insulating barrier includes a box filled with a pack with insulation consisting of mineral wool or perlite. It is further disclosed that a secondary insulating barrier includes a box filled with a material selected from the group consisting of mineral wool, organic wool, low density polymeric foams, and aerogels, in which an exemplary embodiments includes a foam block. However, as discussed in European Patent Application No. EP 2739895, materials such as mineral wool and aerogels offer no or negligible stiffness.

Improvements are sought in such insulation boxes with respect to providing materials for insulation boxes that have both the insulating properties and supportive properties.

SUMMARY

Embodiments may be realized by providing an insulation box of an insulating barrier in a liquefied gas carrier, the insulation box including a box structure that includes a bottom panel, a top panel, external pillars, and optionally at least one internal partition that define at least one void. The at least one void includes at least one multilayer insulation board. Each of the at least one multilayer insulation board includes at least one facer layer, at least one first polyurethane layer having a first density from 100 kg/m³ to 2000 kg/m³ according to ASTM D 1622, and at least one second polyurethane layer having a second density of less than 100 kg/m³ according to ASTM D 1622.

DETAILED DESCRIPTION

According to embodiments, an insulation box that is useable as part of an insulating barrier in a liquefied gas carrier (such as LNG carrier), includes a box structure that defines at least one void (e.g., a plurality of voids). At least one void (e.g., all of the voids present) includes at least one multilayer insulation board therewithin. A single void may include one or more multilayer insulation boards, e.g., a single void may include from 1 to 50 (e.g., 1 to 25, 1 to 10, 2 to 10, 2 to 6, etc.) multilayer insulation boards stacked on top of each other. It is proposed to use the multilayer insulation board to provide both insulating properties and supportive properties (e.g., to increase stiffness and/or buckling resistance) in the insulation box. The multilayer insulation board may provide other advantages, in addition to combining both insulating and supportive features into a single board.

For example, such a multilayer insulation board may be manufactured in a simplified process and cost effective process, e.g., a single continuous process may be used to form each multilayer insulation board, and efficiently cut into a desired shape to fit within a box structure of the insulation box. The multilayer insulation board may allow for ease of placement of insulating materials and supportive materials within a box structure of the insulation box, e.g., such placement includes initial placement during a process of making the insulation box and as a replacement in existing insulation boxes. The multilayer insulation board may allow for customized use within the insulation box, as the multilayer insulation board may be formed in a single continuous process and cut to a desired shape (e.g., cut to the shape of individual voids in the box structure). The multilayer insulation board may reduce the need for additional supportive features (e.g., additional boxes, sealing barriers, pillars, or other supportive means) in insulation boxes. The multilayer insulation board may be fixed directly to the box structure, e.g., without requiring additional structures.

The multilayer insulation board includes at least one facer layer, at least one first polyurethane layer having a first density from 100 kg/m³ to 2000 kg/m³ according to ASTM D 1622 (also referred to as a high density polyurethane layer and a reinforcing layer), and at least one second polyurethane layer having a second density of less than 100 kg/m³ according to ASTM D 1622 (also referred to as a low density polyurethane layer and an insulating layer). The first polyurethane layer is a reinforcing layer. The first polyurethane layer may not be a foam (e.g., may be prepared without the use of an added blowing agent). The second polyurethane layer is an insulating layer, e.g., may be a foam layer. As used herein, polyurethane encompasses polyurethane and polyurethane/polyisocyanurate materials. The multilayer insulation board may have a thickness that is adjusted depending on the manner of intended use in the insulation box.

The box structure of the insulation box may be one that is known in the art, e.g., may be similar to the box 11 disclosed in Chinese Patent No. CN103748401B. The box may be made of wood based products, such as natural wood and/or engineered/manufactured wood. For example, the box may include at least some parts that are made of plywood, e.g., the box may be made entirely of plywood. The box structure includes a bottom panel, a top panel, external pillars, and optionally at least one internal partition. The bottom panel, top panel, and external pillars together may enclose, e.g., essentially completely enclose the one or more multilayer insulation boards. The box structure further includes at least one internal partition that define a at least one void within the box structure. The at least one internal partition may be surrounded by the outer most structure of the insulation box. By internal partition it is meant a stiffener element, e.g., housed substantially within the insulation box. The internal partition may be made of the same material as other components of the box structure or may be made of a different material. The internal partition may cover the full width or height of the box structure and/or may cover a portion of the full width or height of the box structure. For example, the internal partition might not necessarily cover the full width, but may take the shape of stand-alone pillars. The shape and structure of the voids may be defined by the shape of the box structure and the arrangement of the at least one internal partition. At least one void in the box structure includes at least one multilayer insulation board. The box structure may have a height dimension from 0.3 to 3.0 m (e.g., from 0.5 to 2.0 m, from 0.7 to 1.5 m, etc.), a length dimension from 0.3 to 3.0 m (e.g., from 0.5 to 2.0 m, from 0.7 to 1.5 m, etc.), and a width dimension from 0.1 to 2.0 m (from 0.1 to 1.0, from 0.1 to 0.5 m, etc.)

The facer layer of the multilayer insulation board may be one that is known in the art for use in insulation boards such as structural facers. Exemplary facers include a sheet of metal foil (such as steel and/or aluminum), stressed skin of metal foil, glass-fleece, and/or polymers (e.g., polyethylene and/or polypropylene). Exemplary facers include composite foils that may include multiple ply laminates of polymers, papers and/or aluminum. For example, the composite facings may be aluminum/paper laminates, aluminum/paper/aluminum laminates, and/or aluminum/paper/metalized PET (such as ones commercially available from companies such as Walki Group). In exemplary embodiments, the each facer layer is selected from saturated glass-fleece, not-saturated glass-fleece, and aluminum foil. The multilayer insulation board may include two facer layers, each of such facer layers may be the same or different from another facer layer. The one or more facers layers in a single multilayer insulation board may account for less than 10% (e.g., less than 5%, less than 3%, less than 2%, less than 1%, less than 0.5%, less than 0.1%, less than 0.01%, less than 0.001%, etc.) of a total thickness of the multilayer insulation board. The facer layer may have a thickness of less than 3.0 mm, less than 2.0, less than 1.0, less than 0.5, etc.

Polyurethane Layers

The multilayer insulation board includes at least one first polyurethane layer having a high density and at least one second polyurethane layer having a low density. The multilayer insulation board may include one or more of such first polyurethane layers and/or one or more of such second polyurethane layers. The first and/or second polyurethane layers may be continuous layers that extend across the multilayer insulation board, e.g., across an entire length, height, and/or width of the multilayer insulation board.

The first and/or second polyurethane layer may include therewithin a glass web reinforcement, such as an expandable glass web, also referred to as expandable glass fiber mats. The expandable glass web/fiber mat is openable during foam formation and can remain embedded within a cured foam, e.g., a glass web may have poured thereon a reaction mixture for forming a polyurethane foam and during the foam expansion process the glass web is opened and is integrally embedded in the resultant polyurethane foam. The glass web/fiber mat may separate, under the influence of the expanding foam, be distributed throughout the foam in planes substantially parallel to the plane of the facing sheets. Suitable glass fiber mats may have a weight per unit area of from 20 g/m² to 200 g/m², from 30 g/m² to 100 g/m², about 70 g/m², etc. Depending on the foam layer thickness one or more glass webs/fiber mats may be used. One commercially available glass fiber mat suitable for use in various embodiments is Firmat 70 available from Schmelzer Industries.

The glass web reinforcement may be a non-woven, continuous strand of "A" glass surfacing veil. The glass web reinforcement may be embedded in the insulating core. The glass web reinforcement may be placed on the low density polyurethane layer before it is fully cured. The glass web reinforcement may end up embedded in the low density polyurethane layer, across at least a portion of the thickness of the multilayer insulation board. The glass web may help minimize and/or reduce the dimensional changes of at least the low density polyurethane layer (i.e., the foam core). For example, the glass web reinforcement may have a weight per square meter that is from 25 to 500 g/m², from 50 to 300 g/m², from 50 to 200 g/m², from 100 to 200 g/m², etc. The glass web reinforcement may have an average thickness of less than 1.5 mm (e.g., less than 1.0 mm, less than 0.8 mm, less than 0.6 mm, etc.) The density of the first and second polyurethane layers are based on the foam forming formulations, and may not encompass any additionally added glass web reinforcement.

The first polyurethane layer is a high density polyurethane layer, e.g., a non-foam layer. The first polyurethane layer may be formed without adding any physical blowing agents (and optionally without using any chemical blowing agents). The first polyurethane layer may account for 0.5% to 90.0%, 0.5% to 50.0%, and/or for 1% to 90% (e.g., 1% to 88%, 1% to 70%, 1%, to 60%, 1% to 50%, 1% to 49%, 5% to 50%, 2% to 30%, 2% to 20%, 2% to 15%, 2% to 10%, etc.) of a total thickness of the multilayer insulation board. The first polyurethane layer may have a thickness from 0.5 mm to 25.0 mm (e.g., 1.0 mm to 15.0 mm, 1.0 mm to 10 mm, etc.) The first polyurethane layer may have a density from 100 kg/m³ to 2000 kg/m³ (e.g., from 100 kg/m³ to 1200 kg/m³, from 150 kg/m³ to 1000 kg/m³, from 200 kg/m³ to 900 kg/m³, from 250 kg/m³ to 800 kg/m³, from 300 kg/m³ to 800 kg/m³, from 320 kg/m³ to 780 kg/m³, etc.) The first polyurethane layer may include one or more fillers. The amount of the one or more fillers may be from 5 wt % to 60 wt % (e.g., from 5 wt % to 50 wt %, from 5 wt % to 40 wt %, from 5 wt % to 35 wt %, from 10 wt % to 35 wt %, from 12 wt % to 35 wt %, etc.), based on a total weight of a composition for forming the first polyurethane layer. The one or more fillers may include a combination of one or more solid fillers and one or more fire barrier materials. The first polyurethane layer may be rigid or semi-rigid, e.g., may not be brittle. The amount of material dispensed for the first polyurethane layer per meter squared ($m^2$) may be from 500 $g/m^2$ to 5,000 $g/m^2$ (e.g., from 1,000 $g/m^2$ to 4,000 $g/m^2$, 1,000 $g/m^2$ to 3,000 $g/m^2$, etc.)

The first polyurethane layer may be on (e.g., directly on) a first facer layer of the multilayer insulation board and the first facer layer may be on (e.g., directly on) the bottom panel of the box structure. The first polyurethane layer may be continuous and may be continuously bonded to the first facer layer and to the second polyurethane layer. The multilayered insulation board may be oriented in such a way that the first polyurethane layer is closer to the interior of the liquefied gas carrier than the second polyurethane layer. In exemplary embodiments, the bottom of the panel of the box structure may face in a direction of the interior of the liquefied gas carrier, such that the first polyurethane layer is closer to the interior of the carrier than the second polyurethane layer. In other exemplary embodiments, the first polyurethane layer may be positioned to face an exterior of the liquefied gas carrier, such that the second polyurethane layer is closer to the interior of the carrier than the first polyurethane layer. The interior of the liquefied gas carrier houses the liquefied gas.

The second polyurethane layer may be low density polyurethane layer such as a blown rigid polyurethane foam, e.g., formed using one or more physical blowing agents and/ chemical blowing agents. The second polyurethane layer may account for at 10% to 99% (e.g., from 10% to 98%, from 30% to 99%, from 35% to 98%, from 40% to 99%, from 45% to 98%, from 50% to 99%, from 55% to 98%, from 60% to 99%, from 65% to 98%, from 70% to 99%, from 75% to 98%, from 80% to 99%, from 85% to 98%, from 90% to 98%, etc.), of a total thickness of the multilayer insulation board. The second polyurethane layer may have a thickness from 30 mm to 300 mm (e.g., from 50 mm to 200 mm, from 50 mm to 150 mm, from 50 mm to 100 mm, from 75 mm to 100 mm, from 80 mm to 150 mm, etc.) The second polyurethane layer may have a density of less than 100 $kg/m^3$ (e.g., from 20 $kg/m^3$ to 80 $kg/m^3$, from 30 $kg/m^3$ to 60 $kg/m^3$, from 30 $kg/m^3$ to 50 $kg/m^3$, etc.) Exemplary processes for preparing second polyurethane layer include those known to a person of ordinary skill in the art. The second polyurethane layer may be prepared using any combination of physical and/or chemical blowing agents. Examples of chemical blowing agent includes water, and examples of physical blowing agents include hydrocarbons, hydrochlorofluoroolefins, and hydrofluoroolefins. In exemplary embodiments, the second polyurethane layer may be prepared using at least water as a chemical blowing agent and/or a hydrochlorofluoroolefin as a blowing agent.

The second polyurethane layer may be on (e.g., directly on) a second facer layer of the multilayer insulation board and the second facer layer may be on (e.g., directly on) the top panel of the box structure. The second polyurethane layer may be bonded to the second facer layer. The second polyurethane layer may be on (e.g., directly on) the first polyurethane layer. The second polyurethane layer may include one or more expandable glass webs/glass fiber mats.

The systems for forming the first and second polyurethane layers may be one-component or multi-component systems, both of which rely on the presence of polyurethane polymers that are the reaction product of an isocyanate moiety provided from an isocyanate component with an isocyanate-reactive moiety provided from an isocyanate-reactive component to form polyurethane polymers. In particular, polyurethane layers contain urethane moieties and are made by starting materials that include an isocyanate component and an isocyanate-reactive component.

The isocyanate component includes at least one isocyanate (e.g., a polyisocyanate and/or an isocyanate-terminated prepolymer). The isocyanate-reactive component includes at least a polyol component that includes one or more polyols. The isocyanate-reactive component and/or the isocyanate component may each independently include one or more optional additive components that each includes at least one optional additive (such as a blowing agent, a fire barrier material, a filler, a catalyst, a curative agent, a chain extender, a flame retardant, a viscosity modifier, a pigment, a stabilizer, a surfactant, a plasticizer, a zeolite, moisture scavenger, and/or other additives that modify properties of the resultant final polyurethane product).

In exemplary embodiments, the isocyanate component having one or more polyisocyanates and/or one or more of the isocyanate-terminated prepolymers. Exemplary polyisocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings and/or foams. Examples, include modified isocyanates, such as derivatives that contain biuret, urea, carbodiimide, allophonate and/or isocyanurate groups may also be used. Exemplary available isocyanate based products include PAPI™ products, ISONATE™ products and VORANATE™ products, VORASTAR™ products, and other isocyanates products, available from The Dow Chemical Company. The isocyanate-terminated prepolymers are derived from polyisocyanates. The isocyanate-terminated prepolymer may have a free NCO (i.e., isocyanate moiety) content from 5 wt % to 30 wt %.

The polyol component of the isocyanate-reactive component for forming the polyurethane layers may include one or more polyols. The polyol component may include one or more polyols selected from the group of a polyether polyol, a polyester polyol, a polycarbonate polyol, a natural-oil derived polyol, and/or a simple polyol (such as glycerin, ethylene glycol, polyethylene glycol, propylene glycol, polypropylene glycol, butylene glycol, etc., which have a number average molecular weight of less than 500 g/mol). For example, the one or more polyols may include one or more polyether polyols and/or one or more polyester polyols. The polyether polyols may be prepared, e.g., by the polymerization of epoxides, such as ethylene oxide, propylene oxide, and/or butylene oxide. The one or more polyols may have a hydroxyl number from 50 mg KOH/g to 550 mg KOH/g (e.g., 100 to 550 mg KOH/g).

Exemplary polyester polyols include aromatic polyester polyols. For example, the polyester polyol may be made using a composition that includes at least 15 wt % to 45 wt % of terephtalic acid, from 5 wt % to 20 wt % of diethyleneglycol, and 25 wt % to 70 wt % of polyethylene glycol. Other types of polyols may be used such as aliphatic polyester polyols, aliphatic or aromatic polyether-carbonate polyols, aliphatic or aromatic polyether-ester polyols, and polyols obtained from vegetable derivatives. In exemplary embodiments, a polyol component for both the first and second polyurethane layers may include at least one aromatic polyester polyol, e.g., in an amount from 40 wt % to 100 wt % (e.g., 50 wt % to 100%, 60 wt % to 100 wt %, 70 wt % to 100 wt %, 75 wt % to 100 wt %, etc.) based on a total weight of the polyol component (i.e., a total weight of polyols in the isocyanate-reactive component).

For forming the high density polyurethane layer the isocyanate-reactive component may be reacted with the isocyanate component at an isocyanate index from 70 to 800 (e.g., 90 to 700, 80 to 600, 100 to 600, 200 to 550, 250 to 500, 300 to 450, 300 to 400, etc.). For forming the low density polyurethane layer the isocyanate-reactive component may be reacted with the isocyanate component at an isocyanate index from 70 to 800 (e.g., 90 to 700, 80 to 600, 100 to 600, 150 to 550, 200 to 500, 250 to 500, etc.). The isocyanate index is measured as the equivalents of isocyanate in the reaction mixture for forming the polyurethane network, divided by the total equivalents of isocyanate-reactive hydrogen containing materials in the reaction mixture, multiplied by 100. Considered in another way, the isocyanate index is the ratio of theoretical isocyanate-groups over theoretical isocyanate-reactive hydrogen atoms present in the reaction mixture, given as a percentage.

The optional additive component (e.g., for the isocyanate-reactive component) may include one or more blowing agents, e.g., for the low density polyurethane layer. Exemplary blowing agents include hydrocarbons, hydrofluorocarbons (HFC), hydrofluoroolefin (HFO), hydrochlorofluoroolefin (HCFO), water, and carboxylic acids such as formic acid. Blowing agents known in the art for use in rigid polyurethane foams may be used.

The additive component (e.g., for the isocyanate-reactive component) may include one or more fillers, such as fire barrier materials. Exemplary fire barrier materials include an expandable graphite, a ceramifying mixture of inorganic compounds, fibers, porous silica, and hollow glass microspheres. Without intending to be bound to any theory, when exposed to the heat of a developing fire, a polyurethane layer that includes the fire barrier materials may undergo a physical/chemical modification leading to the formation of a highly expanded porous carbonaceous char. When the polyurethane layer containing the fire barrier material is on the fire side (i.e., the hot side that is closer to the fire), the layer may help to protect the other polyurethane layer (such as a foam core) from flame impingement. When the fire barrier layer is on the cold side (i.e., side further away from the fire), the fire barrier layer may help by sealing cracks in the other polyurethane layer and contribute to provide thermal barrier properties.

Expandable graphite (an intercalation compound of graphite also referred to as "exfoliating graphite") is a particulate expandable under fire conditions. Expandable graphite may be prepared, e.g., by immersing natural flake graphite in a bath of chromic acid, then concentrated sulfuric acid. According to an exemplary embodiment, the expandable graphite particles have a particle size from 100μm to 1000μm. The particle size distribution may be from minimum of 65% to 85%>50 mesh. The expandable graphite may be capable of expansion to at least 200 times (e.g., 250 to 350 times) its initial volume. The rate of expansion (min) may be from 275 $cm^3/g$ to 400 $cm^3/g$. Different expandable graphites may have different expansion temperatures. According to an exemplary embodiment, the expandable graphite begins its expansion at around 160° C. to 225° C. Exemplary types of expandable graphite include QUIM-IDROGA Grade 250, NORD-MIN® KP 251 (commercially available from Nordmann Rassmann), and GHL Px95 HE (commercially available from LUH). In exemplary embodiments, an isocyanate-reactive component for forming the high density polyurethane layer may include from 5 wt % to 50 wt % (e.g., 10 wt % to 40 wt %, 15 wt % to 35 wt %, etc.) of expandable graphite. For example, fire barrier materials such as expandable graphite embedded within the polymer matrix of a polyurethane layer may cause the layer material to intumesce when exposed to a flame. Such a behavior might be desirable for liquefied gas carriers having certain reaction-to-fire requirements.

Ceramifying mixture of inorganic compounds refers to a dispersion of a ceramifying mixture of inorganic compounds. The term ceramifying composition includes compositions that decompose and undergo chemical reaction under fire conditions to form a porous, self-supporting ceramic product. Exemplary mixtures include silicate minerals and inorganic phosphates. An additional inorganic filler and/or heat expandable material may be present in the cermifying mixture. The ceramifying mixture may, e.g., include some or all of aluminum trihydroxide, talc, and ammonium polyphosphate. Exemplary mixtures include aluminum trihydroxide (ATH)/talc/ammonium polyphosphate (APP) and talc/APP/zinc borate/expandable graphite.

Fibers refers to supportive fibers such as glass fibers, rock fibers, basalt fibers, and carbon fibers. For example, chopped glass fibers of length 5 mm to 75 mm may be used.

An exemplary form of porous silica is nanoporous silica and particularly silica aerogel. Exemplary, pre-formed dispersions of nanoporous silica in polymer matrix are commercially available as "aerogel blankets". These may include granules of silica aerogel dispersed in non-woven polymer fibers, e.g., of polyethylene and/or polyester. Dispersions of nanoporous silica in a polymer matrix may be formed in situ using commercially available silica aerogel powder.

Hollow glass microspheres refers to hollow glass based materials. Exemplary materials are discussed in International Publication No. WO 2010/065724. Exemplary materials are commercially available (e.g., S35 Glass Bubbles™ from 3M). The hollow glass microspheres may have an average diameter in the range of 10μm to 120μm.

The additive component may include other fillers, such as one or more solid fillers known in the art for use in polyurethane layers. Exemplary solid fillers include, e.g., fly ash, bottom ash, fine sand, ceramic fibers/particles, mineral fibers/particles glass fibers/particles, carbon fibers, carbon blacks, graphite, wood fibers/particles, talcs, clays, silicas, oxides (such as zinc oxides and aluminum oxides), hydroxides (such as aluminum hydroxide), calcium carbonates, plastic powders (such as propylene based powders and acrylonitrile butadiene styrene—ABS-based powders), phosphates, and/or polyamides. In exemplary embodiments, an isocyanate-reactive component for forming the high density polyurethane layer may include from 5 wt % to 50 wt % (e.g., 10 wt % to 45 wt %, 20 wt % to 40 wt %, 25 wt % to 35 wt %, etc.) of a solid filler. For example, the isocyanate-reactive component for forming the high density polyurethane layer may include at least one selected from the group of oxides, hydroxides, and calcium carbonates. Further, the inorganic filler may contribute to stiffness and may reduce dimensional changes upon temperature variations for the multilayer insulation board.

The additive component may include one or more catalysts. For example, the additive component may include a tin and/or amine based catalyst. For example, the catalyst component may account for less than 5.0 wt % of a total weight of the isocyanate-reactive component. Exemplary catalysts include trimerisation catalysts, which promote reaction of isocyanate with itself. Examples of catalysts include tris(dialkylaminoalkyl)-s-hexahydrotriazines (such as 1,3,5-tris(N,N-dimethylaminopropyl)-s-hexahydrotriazine), DABCO™ TMR 30, DABCO™ TMR 31, DABCO™ K-2097 (potassium acetate), DABCO™ K15 (potassium octoate), POLYCAT™ 41, POLYCAT™ 43, POLYCAT™ 46, DABCO™ TMR, tetraalkylammonium hydroxides (such as tetramethylammonium hydroxide), alkali metal hydroxides (such as sodium hydroxide), alkali metal alkoxides (such as sodium methoxide and potassium isopropoxide), and alkali metal salts of long-chain fatty acids having 10 to 20 carbon atoms (and in some embodiments, pendant hydroxyl groups).

The additive component may include one or more curing agents, e.g., a curing agent that includes a bifunctional diamine compound or a trifunctional diamine compound. The optional chain extender component may include a chain extender, e.g., that has two isocyanate-reactive groups per molecule and may have an equivalent weight per isocyanate-reactive group of less than 400. The optional crosslinker component may include at least one crosslinker that has three or more isocyanate-reactive groups per molecule and an equivalent weight per isocyanate-reactive group of less than 400.

The additive component may include one or more moisture scavengers. Exemplary moisture scavengers include zeolite powders, e.g., in a suspension with an oil. The moisture scavengers may be present in an amount from less than 5 wt %, less than 3 wt %, less than 1 wt %, and/or greater than 0.1 wt %, based on a total weight of the isocyanate-reactive component.

Various other additives, e.g., those known to those skilled in the art, may be included in the optional additive component. For example, coloring agents, water-binding agents, surface-active substances, extenders and/or plasticizers may be used. Dyes and/or pigments (such as titanium dioxide and/or carbon black), may be included in the optional additive component to impart color properties to the polyurethane material Pigments may be in the form of solids or the solids may be pre-dispersed in a polyol carrier. Other additives include, e.g., UV stabilizers, antioxidants, air release agents, and adhesion promoters, which may be independently used depending on the desired characteristics of the polyurethane material.

The polyurethane layers may be formed by a spraying and/or pouring application that applies the polyurethane system on a base substrate and/or a surface (e.g., the facer layer). The spraying and/or pouring application may be done on a conveyor device, e.g., in a continuous manner. For example, the spraying and/or pouring may be done inside a panel cavity. The multilayered insulation boards may be made prior to placing them within the box structure of the insulation box and/or may be made directly within the box structure of the insulation box.

Insulation Box

The insulation box includes the box structure that defines an outer most structure of the insulation box and at least one void therewithin. The multilayer insulation board includes at least the facer layer, high density polyurethane layer, and low density polyurethane layer. The multilayer insulation board may be cut into proper dimensions to fit with the dimensions of the corresponding void in the box structure. The multilayer insulation board may be bonded with the use of a separate adhesive layer the box structure. However, specialized structures may not be required to effectively position the multilayer insulation board within the box structure, as the board provides both insulating and supportive properties. The pile-up of layers of multilayered insulation boards (e.g., three layers of 100 mm thick multilayered insulation boards for a 300 mm high box) may provide both thermal insulation and contribution to withstanding impact pressure. The thickness of the multilayered insulation board may be selected to provide the desired distance between reinforcement layers. For example, a 300 mm high box may be filled with three 100 mm thick boards or five 60 mm thick boards.

If the multilayered insulation boards are laid down parallel to the bottom panel of the box structure, the high density layers may help retain the original position and/or reduce the possibility of (or prevent) buckling of panels, pillars, and/or internal partitions used to strengthen the box structure of the insulation box. A pile-up of the multilayered insulation boards laid down parallel to the bottom face of the box structure may also provide advantages for thermal insulation. For example, the high density layer help reduce the contraction of the board upon cooling, thereby reducing any gaps (and in turn the thermal bridges) that might form between the insulation and the box. Different orientations of the multilayered insulation boards inside the box structure may also be possible, e.g., orthogonal to the bottom panel of the box structure. Different orientations may help to provide some additional resistance in the thickness direction.

The method for producing the multilayered insulation boards may involve a continuous process that includes (e.g., consists essentially of) the following stages: 1) provide a facer layer as a lowermost layer, 2) dispense a first reaction mixture (e.g., for forming the high density polyurethane layer) on the facing as the lowermost layer to form a first foam layer, 3) optionally provide a glass fiber reinforcement such as expandable glass web/glass fiber mat (optional), 4) dispense a second reaction mixture (e.g., for forming the low density polyurethane layer) on the first foam layer, 5) optionally provide a glass fiber reinforcement such as expandable glass web/glass fiber mat (optional), 6) optionally provide a second facing as an uppermost layer, 7) allow the forming composite sandwich panel to cure under the constrained rise of two spaced-apart opposed forming conveyors. Optionally, an adhesive layer may be used between a facing and the high density polyurethane layer and/or between a facing and the low density polyurethane layer. To reduce the possibility of and/or prevent mixing of the first and the second reaction mixtures, the reactivity of the first forming layer may be adjusted in such a way that it gets at least a certain degree of cure at the time of pouring of the second layer. The process, as described above, result in an asymmetric composite panel. Symmetric panels, if desired, can be produced as well, with the additional step of applying a reaction mixture to form a high density layer on the inner face of the uppermost facing.

All parts and percentages are by weight unless otherwise indicated. All molecular weight information is based on number average molecular weight, unless indicated otherwise.

Examples

Approximate properties, characters, parameters, etc., are provided below with respect to various working examples, comparative examples, and the materials used in the working and comparative examples.

The following materials are used:

| | |
|---|---|
| VORATHERM™ CN 815 | A formulated polyol component having an OH number of 234 mgKOH/g and a water content of 0.8 wt %, the component including a polyester polyol, polyether polyol, TCPP, silicone surfactant, and catalyst (available from The Dow Chemical Company). |
| Formulated System 1 | A formulated system including a mixture of (i) 63.3 parts by weight (pbw) of an terephtalic acid based polyester polyol having an OH number 215 and functionality 2, (ii) 21 pbw of another terephtalic acid based polyester polyol having OH number 315 and functionality 2.4, (iii) 15.7 pbw of trichloroisopropylphosphate, (iv) 0.8 pbw of water, (v) 4 pbw of TEGOSTAB® B 8421 available from Evonik, and (vi) 1 pbw of POLYCAT® 5 available from Evonik. |
| Formulated System 2 | A formulated system including a mixture of (i) 58 parts by weight (pbw) of an terephtalic acid based polyol having an OH number 215 and functionality 2, (ii) 15 pbw of a polyethylene glycol having a number average molecular weight of 400, (iii) 15 pbw of trichloroisopropylphosphate, (iv) 6.5 pbw of triethylphosphate, (v) 3 pbw of Niax L-6633 available from Momentive, and vi) 1.5 pbw of DABCO® TMR 31 available from Evonik. |
| Expandable Graphite | An expandable graphite, having a particle size distribution of min 70% > 50 mesh, a starting expansion temperature from 180-220° C., a rate of expansion of min 300 cm³/g, a minimum carbon content of 95 wt %, and a maximum moisture content of 1 wt % (available as the product GHL PX95 HE from LUH). |
| Calcium Carbonate | A calcium carbonate product (available as Omyacarb® 5T from Omya). |
| Aluminum Hydroxide | An aluminum hydroxide product (available as MARTINAL® OL-104 LEO from Albemarle). |
| Moisture Scavenger | A desiccant paste including 50 wt % of a zeolite powder suspension in castor oil (available from The Dow Chemical Company). |
| Dispersing Additive | A dispersing agent (available as BYK-W 969 from BYK). |
| VORACOR™ CM 639 | A catalyst (available from The Dow Chemical Company). |
| VORATHERM™ CN 626 | A catalyst (available from The Dow Chemical Company). |
| DABCO® TMR7 | A trimerization catalyst (available from Evonik). |
| VORANATE™ M 600 | A polymeric MDI, having an average NCO content of approximately 30.5 wt % (available from The Dow Chemical Company). |
| VORANATE™ M 220 | A polymeric MDI, having an average NCO content of approximately 30.9 wt % (available from The Dow Chemical Company). |

Sample multilayer insulation boards are prepared using the one of the two insulating foam formulations shown in Table 1 and one of three reinforcing layer formulations shown in Table 2.

For the Working and Comparative Examples, the insulating layer (low density polyurethane layer) is prepared according to method discussed below using one of the two Insulating Layer formulations as follows:

TABLE 1

| | IL1 | IL2 |
|---|---|---|
| Insulating Foam Formulation (parts by weight) | | |
| VORATHERM™ CN 815 | 100.0 | — |
| Formulated System 1 | — | 105.8 |
| VORATHERM™ CN 626 | 3.6 | — |
| DABCO® TMR7 | — | 1.2 |
| n-pentane (blowing agent) | 12.6 | 22.8 |
| VORANATE™ M 600 | 195.0 | 260.0 |
| Properties | | |
| Isocyanate Index | 275 | 420 |

In particular, to form a reaction mixture for forming the insulating layer, an isocyanate-reactive component is formed by mixing the Formulated System 1 and the additives shown above in Table 1 to for a pre-mixture. Then, the pre-mixture and the isocyanate (VORANATE™ M 600) are delivered to the mixing head of a mix-dispensing machine (e.g., a high pressure polyurethane machine), where the pre-mixture and the isocyanate are mixed by way of high-pressure impingement to form foam layers.

For the Working Examples, the reinforcing layer (high density polyurethane layer) of the multilayer insulation board is prepared according to the method discussed below using one of the Reinforcing Layer formulations as follows:

TABLE 2

| | RL1 | RL2 | RL3 |
|---|---|---|---|
| Reinforcing Layer Formulation (parts by weight) | | | |
| Formulated System 2 | 99 | 99 | 99 |
| Expandable Graphite | 38 | 38 | 44 |
| Calcium Carbonate | 77 | — | — |
| Aluminum Hydroxide | — | 67 | — |
| Moisture Scavenger | 1 | — | 2 |
| Dispersing Additive | 1 | 1 | — |
| VORATHERM™ CN 626 | 1 | 1 | 1 |
| VORANATE™ M 220 | 151 | 151 | 151 |
| Properties | | | |
| Isocyanate Index | 357 | 357 | 357 |
| Amount of filler in Formulation (wt %) | 31.2 | 29.4 | 14.8 |

In particular, to form a reaction mixture for forming the reinforcing layer, an isocyanate-reactive component is formed by mixing the Formulated System 2 and the additives shown above in Table 2 to for a pre-mixture. Then, the pre-mixture and the isocyanate (VORANATE™ M 220) are delivered to the mixing head of the mix-dispensing machine.

The facer layer is selected from one:

(1) FL1: embossed aluminum foil, having a thickness of 50 micron (2) FL2: saturated glass fleece, available as STONEGLASS 300 from Silcart having a mass per unit area of 280 to 320 g/m².

The glass fiber reinforcement is expandable glass-web, available as Firmat 70 g/m² from Schmelzer Industries.

The Insulating Layer of Table 1, the Reinforcing Layer of Table 2, and/or the other materials listed above are used to form Working Examples 1-8 and Comparative Examples A and B, according to Table 3, below.

TABLE 3

| | Ex 1 | Ex 2 | Ex 3 | Ex 4 | Ex 5 | Ex 6 | Ex 7 | Ex 8 | Ex A | Ex B |
|---|---|---|---|---|---|---|---|---|---|---|
| Panel Description | | | | | | | | | | |
| Board Thickness | 100 | 100 | 100 | 100 | 100 | 100 | 100 | 100 | 100 | 100 |
| Insulating Layer Type | IL1 | IL1 | IL1 | IL1 | IL1 | IL1 | IL2 | IL2 | IL1 | IL2 |
| Insulating Layer Density (kg/m$^3$) | 40 | 40 | 40 | 40 | 45 | 45 | 33 | 36 | 40 | 36 |
| Reinforcing Layer Type | RL3 | RL3 | RL1 | RL2 | RL3 | RL3 | RL1 | RL1 | — | — |
| Reinforcing Layer Density (kg/m$^3$) | 660 | 330 | 360 | 250 | 645 | 750 | 530 | 530 | — | — |
| Reinforcing Layer Thickness (mm) | 3.5 | 7.1 | 6.5 | 9.4 | 2.4 | 3.5 | 4.3 | 4.5 | — | — |
| Reinforcing Layer amount (g/m$^2$) | 2350 | 2350 | 2350 | 2350 | 1560 | 2650 | 2250 | 2400 | — | — |
| Lower Facer Layer | FL1 | FL1 | FL1 | FL1 | FL1 | FL1 | FL1 | FL2 | FL1 | FL2 |
| Upper Facer Layer | FL1 | FL1 | FL1 | FL1 | FL1 | FL1 | FL1 | FL2 | FL1 | FL2 |
| Glass Fiber Reinforcement | No | No | No | No | No | Yes | No | No | No | No |
| Panel Properties | | | | | | | | | | |
| U-value at 10° C. (W/m$^2$ · K) - Parallel to layers | 0.23 | 0.25 | 0.23 | 0.24 | 0.21 | N/A | N/A | N/A | 0.20 | 0.22 |
| U-value at 10° C. (W/m$^2$ · K) - Perpendicular to layers | 0.24 | 0.25 | 0.25 | 0.26 | 0.22 | 0.24 | 0.24 | N/A | 0.20 | 0.22 |
| Thermal Conductivity of Insulating Layer at 10° C. (mW/mK) | 19.6 | 19.9 | 19.8 | 21.3 | 19.8 | N/A | N/A | 21.9 | 20.0 | 21.5 |
| Indentation (N) * | 655 | 551 | 527 | 798 | 435 | 850 | N/A | 569 | 163 | 153 |
| Compression 1 (kPa) ** | 470 | — | — | — | — | 649 | — | 453 | 236 | 146 |
| Compression 2 (kPa) *** | 747 | 636 | 526 | 534 | 394 | — | 518 | — | — | — |

\* Indentation is measured as max stress orthogonal to layers.
\*\* Compression 1 is measured as max stress parallel to layers with the load applied by 18 mm thick plywood board.
\*\*\* Compression 2 is max stress parallel to layers with the load applied by 10 mm thick aluminum plate.

The reinforcing layer for Working Examples 1, 5, and 6 includes 5 parts by weight of the Moisture Scavenger, and Examples 7 and 8 include 2 parts by weight of the Moisture Scavenger.

To prepare Working Examples 1 to 8 and Comparative Examples A and B, a SAIP™ continuous line with a double conveyor of 18 meters may be used. The process for forming Working Examples 1 to 8 includes the following stages: (i) feed a lower facing as specified in Table 3, (ii) dispense the reinforcing layer formulation as specified in Table 3 from a mix-dispensing machine and allow time for the composition to at least partially cure, (iii) dispense the foam layer formulation by a SAIP high-pressure (HP) mix-dispensing machine, (iv) feed an upper facing as specified in Table 3, (v) allow the foam core to rise and cure under the constrained rise of a heated double conveyor. The panel exiting from the conveyor is cut to the desired sample size. Working Example 6 further includes the additional stage after (iii) and before (iv) of laying down the expandable glass web, which is an expandable glass-web layer. Comparative Examples A and B may be formed using a similar process, except that the stage of dispensing the reinforcing layer formulation is excluded.

Working Examples 1 to 8 and Comparative Examples A and B are prepared in a continuous process with a double conveyor temperature of approximately 60° C., having a line speed of approximately 4 m/minute, an insulating layer and reinforcing layer chemical precursors at temperature of 22° C., and facing layers at room temperature. For Working Examples 1 to 8 and Comparative Examples A and B the dispensing of the foam core forming composition are carried out by connecting a high-pressure mixing head with two fixed plastic pipes with holes centered at 42 mm. The two pipes are positioned side-by-side across the width of the line. With respect to Working Examples 1 to 8, the dispensing of the composition for forming the reinforcement layer is carried out by connecting the mixing head to a discharging device consisting in a distribution chambers and a plurality of plastic hoses fixed to a bar across the width, said hoses are centered at a distance of 25 mm, Referring to the examples, the exploitable features of the use of multilayered boards having a high-density reinforcing layer for insulation boxes includes:

(1) Pile-up of boards laid down horizontally (with the reinforcing layers parallel to the main dimensions of the insulation box): (a) may reduce thermal bridges (reduced gaps) based on smaller dimensional changes at low temperature; (b) may improve load bearing behavior based on combination of the reinforcing layer helping to dissipate over larger area any local stress and the reinforcing layer providing multiple reinforcements to reduce the possibility of buckling of the wooden stiffeners.

(2) Pile-up of boards laid down vertically (with the reinforcing layers perpendicular to the main dimensions of the insulation box): (a) may improve load bearing behavior based on the stiffening effect of the reinforcing layers.

(3) Pile-up combining layers with parallel and orthogonal orientation: (a) versatility to design may improve mechanical strength without significantly impacting thermal insulation (e.g., see U-value). For example, when comparing the use of polyurethane foam insulation boards, without the reinforcing layer, worsening in U-value might be limited to 15% or less.

In additional, from a manufacturing standpoint, the process allows versatility for attaining reinforcing layers of desired stiffness playing on density, thickness, and composition. Also, the continuous process is suitable for cost-effective mass production.

Density of the insulating layer and the reinforcing layer are measured according to ASTM D 1622 (applied density).

U-value at 10° C. (W/m²·K)—Parallel to layers is calculated as the reciprocal of R-value. Whereas, R-value of a multilayer board is calculated as the contribution of individual layers obtained as a thickness of the layer divided by its thermal conductivity value. The thermal conductivity value is determined as follows:

The thermal conductivity of the Insulating Layer at 10° C. is measured by means of a LaserComp heat flow-meter instrument using specimen of dimensions 200×200 mm×25 mm (thickness). The same equipment is used to measure the thermal conductivity of specimen comprising the high density polyurethane layer and part of the thickness of the low density polyurethane foam layer. From the measurements of thermal conductivity of the thermal conductivity of the low density polyurethane foam layer and of the composite it is possible to estimate the thermal conductivity of the high density polyurethane layer. For validation purpose four samples of the high density layers are prepared at the following densities: 192, 297, 393, and 422 kg/m3. All results are plotted together showing for the range that is investigated a linear fit of thermal conductivity versus density (0.055 at density 200 kg/m³, 0.083 at density 300 kg/m³, 0.110 at 400° C.). The measured values of the thermal conductivity of the low density polyurethane layer and the values estimated as described above for the high density polyurethane layer are then utilized to calculate U values of the composites in both orientations of heat flow, orthogonal to layers and parallel to layers.

Indentation is measured using the following conditions: traverse speed of 50 mm/minute, load cell of 10 kN, load applied orthogonal to the layers using a hemispheric indenter having a diameter of 19 mm (as specified in PV3960), and specimen of dimensions 200×200 mm×full thickness are tested with their bottom part engaged in a rectangular metal box of 200 mm (Length)×200 mm (Width) and 40 mm walls. The metal box helps to hold the specimen in place during the test. Panel samples of Working Examples have been tested on the surface having adjacent the high density layer Compression with load parallel to the layers is measured according to the following: specimen of full thickness (100 mm) have been cut with dimensions 200×100 mm Two specimen of said dimensions have been arranged side by side, turned with their high density layers on the opposite external sides (for symmetry reason), and engaged for their bottom parts in a rectangular metal box of dimensions 200 mm (Length), 200 mm (Width) and 40 mm wall (to hold the assembly in position, preventing sliding apart). The load have been transferred from the circular plate of the Dynamometer (15 cm diameter) to a rigid squared plate made of plywood (18 mm thick) or of Aluminum (10 mm thick). It has been noted that plywood, selected as being representative of the final application, slightly bend under the testing conditions for panel samples of Working Examples. The compression test has been carried out using a load cell of 30 kN and a traverse speed of 1 mm/minute.

The invention claimed is:

1. An insulation box of an insulating barrier in a liquefied gas carrier, the insulation box comprising:
    a box structure that includes a bottom panel, a top panel, and external pillars define at least one void; and
    the at least one void includes at least one multilayer insulation board, each of the at least one multilayer insulation board including at least one facer layer, at least one first polyurethane layer having a first density from 100 kg/m³ to 2000 kg/m³ according to ASTM D 1622 having publication date of May 2014 and accounting for 0.5% to 50.0% of a total thickness of the multilayer insulation board, and at least one second polyurethane layer having a second density of less than 100 kg/m³ according to ASTM D 1622 having publication date of May 2014.

2. The insulation box as claimed in claim 1, wherein:
    the at least one first polyurethane layer is the reaction product of a first mixture that includes at least a first isocyanate component, a first isocyanate-reactive component, and one or more fillers,
    an isocyanate index of the first mixture is from 80 to 600, and
    the first mixture excludes any additionally added physical blowing agents.

3. The insulation box as claimed in claim 2, wherein the first isocyanate-reactive component includes the one or more fillers in an amount from 5 wt % to 60 wt %, based on a total weight of the first mixture.

4. The insulation box as claimed in claim 3, wherein the one or more fillers includes expandable graphite.

5. The insulation box as claimed in claim 1, wherein:
    the at least one second polyurethane layer is the reaction product of a second mixture that includes at least a second isocyanate component, a second isocyanate-reactive component, and a physical blowing agent, and
    an isocyanate index of the second mixture is from 80 to 600.

6. The insulation box as claimed in claim 1 wherein the second polyurethane layer includes a glass fiber reinforcement.

7. The insulation box as claimed in claim 1, wherein the insulation box is a part of an insulating barrier in a liquefied natural gas carrier.

8. A process of forming the insulation box as claimed in claim 1, wherein the process includes providing the box structure and placing the at least one multilayer insulation board in the box structure.

9. The insulation box as claimed in claim 1, wherein the box structure further includes at least one internal partition that defines the at least one void.

* * * * *